Feb. 2, 1965   R. V. OWEN ETAL   3,168,615
CLIP FOR CONNECTING ELECTRICAL CONDUCTORS
Filed Oct. 15, 1962                    2 Sheets-Sheet 1

INVENTORS
RODNEY V. OWEN &
JOSEF PEROUTKA
BY
Dunlap, Laney & Hubbard
ATTORNEYS

Feb. 2, 1965  R. V. OWEN ETAL  3,168,615
CLIP FOR CONNECTING ELECTRICAL CONDUCTORS
Filed Oct. 15, 1962  2 Sheets-Sheet 2

INVENTORS
RODNEY V. OWEN &
JOSEF PEROUTKA
BY
*Dunlop, Laney & Hubbard*
ATTORNEYS

United States Patent Office 3,168,615
Patented Feb. 2, 1965

3,168,615
CLIP FOR CONNECTING ELECTRICAL CONDUCTORS
Rodney V. Owen, 3224 SE. 19th, and Josef Peroutka, 100 NE. 11th, both of Oklahoma City, Okla.
Filed Oct. 15, 1962, Ser. No. 230,319
14 Claims. (Cl. 174—84)

This invention relates to a device for connecting electrical conductors to each other. More particularly, but not by way of limitation, the present invention relates to a device for removing the insulation from the ends of a pair of electrical conductors and for placing such conductors in electrically conducting communication with each other.

A number of types of structures have heretofore been proposed for connecting the ends of insulated electrical conductors to each other through an electrically conductive bridge so that a current may flow through the instrumentality of the bridge from one electrical conductor to the other. In most instances, such connectors comprise one or more sets of jaws which receive the ends of the electrical conductors and which include teeth which are adapted to pierce the insulating coatings of the electrical conductors and thereby establish contact with the metal core of the conductor. In other instances, the insulating coating around the electrical conductor is initially manually removed for a portion of the length of the conductor adjacent the ends thereof, and the exposed metallic cores of the conductors are then placed in electrically conductive communication with each other by biasing an electrically conductive portion of the clip into contact with the exposed wires.

The disadvantage inherent in clips which depend upon teeth or tines to pierce the insulating coating of the conductor and, in this manner, establish contact with the metallic core of the conductor is that frequently the insulating coating is not completely pierced by the teeth and a poor contact is established. Moreover, it is difficult to maintain over extended periods of time a satisfactory point contact between the points of the teeth and the metallic core of the electric conductors. The present invention provides a device for connecting a pair of electrical conductors to each other, which device functions to substantially simultaneously remove the insulating material from a portion of the conductors adjacent the ends thereof and to establish electrically conductive communication between the bared ends of the conductors.

In a broad aspect, the present invention comprises a pair of opposed arcuate or concave members which are adapted by virtue of their flexibility to be biased from their arcuate configuration into a substantially monoplanar configuration. The arcuate members are each provided with slots at each of the ends thereof, which slots cooperate upon compression of the arcuate members with the mating slots in the opposed arcuate member to grip an electrical conductor which is extended between the two arcuate members.

The slots which are formed in one end of each of the arcuate members are of a configuration such that the electrical conductor passed therethrough is merely firmly gripped and is prevented from moving relative to the legs of the arcuate members carrying such gripping slots. The mating slots which are formed in the opposite end portions of the arcuate members, however, may be defined by sharpened portions of the respective arcuate members in which they are formed so that, as the arcuate members are compressed toward each other, these slots tend to continually diminish in their total areal dimension and, in so doing, bite into and sever the insulation around the electrical conductor which is passed therethrough. Continued compression of the opposed arcuate members results in the portion of the insulation which has been severed in this manner being stripped off the ends of the electrical conductor.

In a preferred embodiment of the invention, as the severed insulation is moved off the end of the electrical conductor by compression of the opposed arcuate members, a pair of raised contact surfaces which are secured to the legs of the arcuate members which carry the mating, insulation-severing slots are brought into contact with the exposed metal core of the conductors, thereby establishing positive electrically conductive communication between the conductors.

As a means of retaining the opposed arcuate members in spaced relation to each other to permit the electrical conductors to be passed therethrough, a band of flexible material is connected to each of the arcuate members and retains these members in the desired spatial relation. In a preferred embodiment of the invention, the band which is employed for interconnecting the opposed arcuate members comprises an elongated flat band of suitably flexible material which is bent along transverse bend lines into the shape of a generally diamond-shaped, isosceles trapezium. The arcuate members are positioned inside the trapezium and are each connected at one of their ends to the ends of the elongated band of material forming the trapezium.

In the operation of the trapezium-shaped embodiment of the invention, the vertices of the trapezium which lie at opposite ends of its minor axis are subjected to opposing forces which tend to flatten the trapezium and the two arcuate members contained therein to a monoplanar configuration. As the trapezium is compressed, the arcuate members undergo the movement hereinbefore described and, in this way, strip away the insulation adjacent the ends of a pair of insulated, electrical conductors extended through the opening in the trapezium and between the opposed arcuate members. Simultaneously, electrically conductive contact is established between the bared metallic cores of the electrical conductors so that said conductors are electrically connected to each other.

From the foregoing description of the invention, it will have become apparent that it is a major object of the present invention to provide a device for electrically connecting insulated electrical conductors in a simple, efficient manner without the need of special tools.

An additional object of the present invention is to provide a device for quickly and easily removing a specific length of insulation material from the ends of a pair of electrical conductors.

An additional object of the present invention is to provide a clip for electrically connecting a pair of electrical conductors, which clip may be operated to simultaneously remove a specific length of insulation material from said conductors and simultaneously to establish electrical communication between the exposed metallic cores of said conductors.

Another object of the present invention is to provide a rigid tip or cap for any electrical conductor or pair of conductors, which tip may be permanently fastened to such conductors and thereby permit additional appliances to be attached by various means to the conductors through the instrumentality of the invention.

An additional object of the present invention is to provide a clip for connecting electrical conductors, which clip is of simple structure and which may be produced, packaged and sold in large quantities at comparatively low cost.

Another object of the present invention is to provide a device for electrically connecting a pair of electrical conductors, which device is sufficiently small to be carried in an electrician's pocket or tool kit.

Other objects and advantages of the invention, in addition to those hereinbefore described, will become apparent as the following detailed description of the invention is read in conjunction with a perusal of the accompanying drawings.

Figure 1:
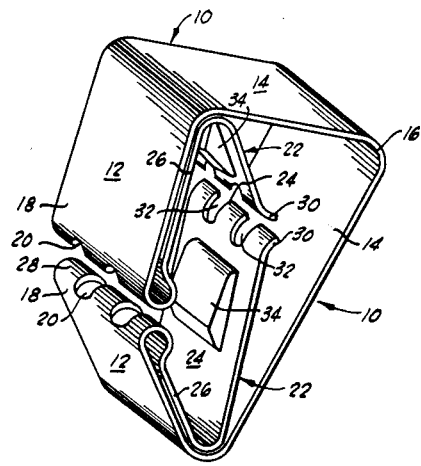
FIGURE 1 is a perspective view of a clip for connecting electrical conductors constructed according to the present invention.

Referring now to the drawings in detail, and particularly to FIGURE 1, the clip of the invention comprises a pair of generally V-shaped arms designated generally by reference character 10. Each of the generally V-shaped arms comprises a jaw portion 12 and a leg portion 14. The leg portions 14 of the generally V-shaped arms 10 are preferably connected to each other through a bight or web portion 16. In a preferred configuration of the clip, the V-shaped arms 10 are substantially identical and are symmetrically disposed on opposite sides of the bisector of the angle formed by said leg portions. In other words, the interconnected generally V-shaped arm portions 10 together form a kite or diamond shape trapezium with an opening defined by the free ends 18 of the jaw portions 12 disposed adjacent and opposite each other at one corner or vertex of such trapezium. The generally V-shaped arms 10 and the web portion 16 by which they are interconnected are preferably integrally formed from a flat, elongated band of material which may be either electrically conducting or non-conducting, but which is preferably made from an electrically conductive metal.

Figure 5:
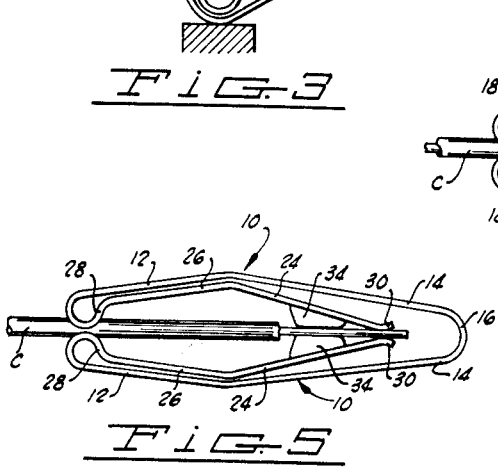
FIGURE 5 is a side view of the clip of the invention as it appears when it has been totally compressed to remove the insulation from a pair of electrical conductors placed therein, and to establish positive physical and electrically conductive contact with said conductors.
Figure 4:
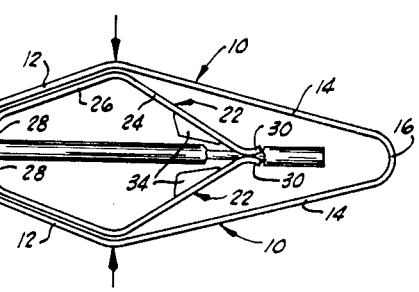
FIGURE 4 is a side view of the clip of the invention as the same appears when it has been partially compressed to commence the removal of the insulation from a pair of electrical conductors which are positioned in the clip.

In the ends 18 of the flat, elongated band there are formed at at least one and preferably a pair of slots 20 which are dimensioned to snugly receive generally cylindrically insulated electrical conductors of conventional dimension. The slots 20 which are formed in the ends 18 of the generally V-shaped arms 10 are of a size such that when insulated electrical conductors are placed between the ends 18 of the arms and the arms are then pressed toward each other, the electrical conductors will not be entirely surrounded by the mating slots 20. This relationship is illustrated in FIGURES 4 and 5 of the drawings.

Positioned in the angles between the jaw portions 12 and the leg portion 14 of each of the generally V-shaped arms 10 are a pair of cooperating, arcuate or preferably V-shaped flexible insulation stripping elements designated generally by reference character 22. Each of the V-shaped flexible insulation stripping elements 22 includes a pair of legs 24 and 26. Each leg 26 is approximately coextensive in length with the jaw portions 12 of the generally V-shaped arms 10. The V-shaped insulation stripping elements 22 are positioned inside the trapezium formed by the generally V-shaped arms 10 so that the legs 26 of the insulation stripping elements extend parallel, and are closely adjacent, to the jaw portions 12 of the generally V-shaped arms 10.

In a preferred embodiment of the invention, the legs 26 of the insulation stripping elements 22 are connected to their respective adjacent jaw portions 12 through a generally cylindrical portion 28. We prefer to form the clip of the invention from a single, flat elongated band of flexible material so that the generally V-shaped arms 10, the V-shaped insulation stripping elements 22 and the interconnecting cylindrical portions 28 are integral and continuous. With the clip fabricated in this manner, the slots 20 which are formed in the ends 18 of the generally V-shaped arms 10 extend circumferentially in the cylindrical portions 28, as best illustrated in FIGURE 1, and have an effective depth such that the electrical conductors extended through such slots between the jaw portions 12 will not be entirely surrounded by such slots when the jaws are moved toward each other in the manner illustrated in FIGURES 4 and 5.

The legs 24 of the V-shaped insulation stripping elements are each provided at their free ends with a number of slots which correspond in number to the number of slots which are formed in the ends 18 of each of the generally V-shaped arms 10. The portion of the legs 24 adjacent the ends 30 is bent along a transverse bend line so that the legs 24 tend to occupy at their ends 30 a plane extending substantially parallel to the bisector of the angle formed by the leg portions 14 of the generally V-shaped arms 10. This configuration of the legs 24 is most apparent in FIGURES 2 and 3.

The slots 32 which are formed in the ends 30 of each of the legs 24 extend into the legs in a longitudinal direction for a sufficient distance that the slots pass through the transverse bend line spaced inwardly from the ends of the legs. An electrically conductive contact abutment or protuberance 34 is provided on each of the legs 24 of the V-shaped insulation stripping elements 22 and is positioned adjacent the slots 32. The electrically conductive contact abutments 34 are positioned on the V-shaped insulation stripping elements so that, as the stripping elements are compressed toward a substantially monoplanar configuration, the electrically conductive contact abutments 34 are converged toward each other in the manner illustrated in FIGURES 4 and 5.

Figure 2:
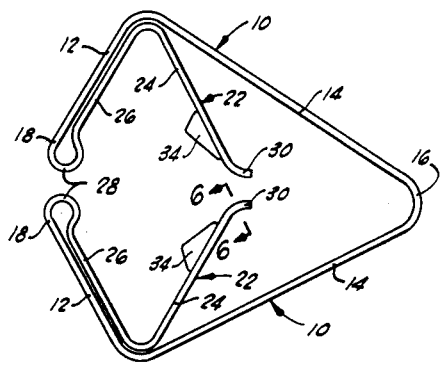
FIGURE 2 is a side view of the clip illustrated in FIGURE 1.
Figure 3:
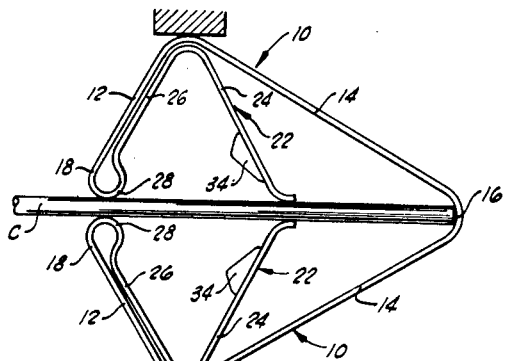
FIGURE 3 is a side view of the clip illustrated in FIGURE 1 and showing the manner in which a pair of electrical conductors which are to be connected are placed in the clip and the points at which suitable means for actuating the clip are brought into contact with the clip.

The operation of the preferred embodiment of the invention illustrated in FIGURES 1 and 2 and hereinbefore described in detail can best be understood by reference to FIGURES 3 through 5. To utilize the clip of the invention, at least one electrical conductor C is passed through the open corner of the trapezium or quadrangle formed by the interconnected generally V-shaped arms 10 so that the free end of the insulated electrical conductor C is adjacent, or in juxtaposition to, the bight portion 16 of the clip. It will be perceived in referring to FIGURE 3 of the drawings that, in this position, the electrical conductor C extends between the two V-shaped insulation stripping elements 22. In the open position of the clip illustrated in FIGURES 1 through 3, there is just a sufficient clearance provided between the insulation stripping elements 22 to permit passage of the electrical conductor C therethrough. After the electrical conductor or conductors C have been passed between the insulation stripping elements 22 in the manner illustrated in FIGURE 3, the conductors C are aligned with the slots 20 formed in the cylindrical portions 28 of the clip and also the slots 32 formed in the ends 30 of the V-shaped insulation stripping members 22.

Opposing compressive forces are next applied to the opposite corners of the trapezium shaped clip and these forces act inwardly on the clip and compress both the V-shaped insulation stripping elements 22 and the generally V-shaped arms 10 into a substantially monoplanar configuration. As the V-shaped stripping elements 22 are compressed in this manner, the ends of the legs 24 and 26 thereof are extended away from each other. Simultaneously, the ends 18 of the generally V-shaped arms 10 are converged to tightly grip the electrical conductors C in the slots 20 formed therein.

Figure 6:
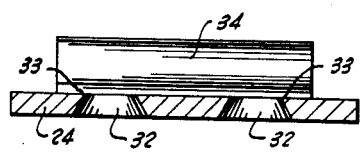
FIGURE 6 is a sectional view taken along line 6—6 of FIGURE 2 illustrating the conductor-gripping slots of the clip of the invention and showing the manner in which the portion of the clip around such slots may be sharpened to facilitate the removal of some types of insulating material.

The ends 30 of the legs 24 of the insulation stripping elements 22 are also converged toward each other, and in moving in the manner shown in FIGURES 4 and 5 of the drawings, bite into and sever the insulation which surrounds the electrical conductors. The severing action of the ends 30 of the insulation stripping elements 22 actually results from a continual and gradual diminishing of the total areal size of the opening formed by the mating slots 24 in the ends 30. When the clip is to be used to strip away insulating material which is particularly tough, the portions of the legs 24 which surround and define the slots 32 may be sharpened to a cutting edge 33 as shown in FIGURE 6.

FIGURES 7 through 10 show various modified embodiments of the present invention in which the basic clip depicted in FIGURES 1 through 5 is modified to adapt the clip to special usages in varying circumstances.

Figure 7:
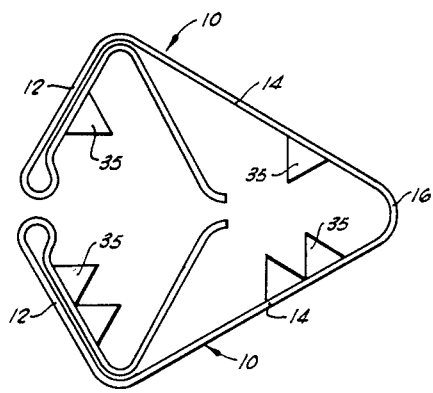

In FIGURE 7, a plurality of teeth 35 are provided in opposed relation on the inside surfaces of both of the leg portions 14 of the generally U-shaped arms 10, and also the leg portions 26 of the V-shaped insulation stripping elements 22. The function of the teeth 35 is to bite into the electrical conductor and the insulator surrounding it and more securely retain the electrical conductor or conductors within the clip when it is to be subjected to larger vibrational or other forces tending to remove the conductors than that which is ordinarily encountered. It will be noted in referring to FIGURE 6 that the teeth 35 positioned on opposite sides of the clip are arranged to cooperate with each other and intermesh or mate when the clip is flattened into a monoplanar position, such as that illustrated in FIGURE 5 of the drawings.

In many instances, it will be preferred or necessary to join a pair of electrical conductors in end-to-end or tandem relation, rather than in parallel relation, such as those which are joined by the use of a clip of the type shown in FIGURES 1 through 5. In such eventuality, a pair of the conductor connecting clips are joined together in back-to-back relation in the positions shown in FIGURE 8 and, instead of a pair of slots being provided in the end portions 18 of the generally V-shaped arms 10 and in the ends 30 of the legs 24 of the V-shaped insulation stripping elements 22, only a single slot is provided in each of these locations so that a single conductor is accommodated.

Figure 9:
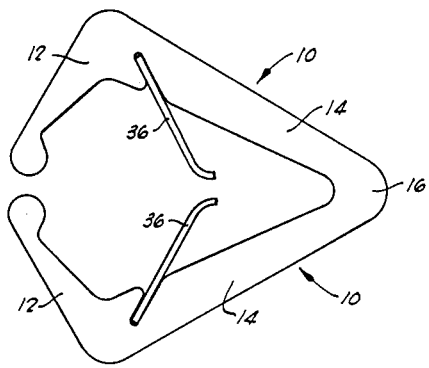
FIGURES 7 through 10 illustrate additional embodiments of the invention.
Figure 8:
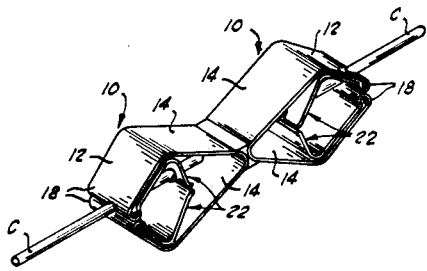

Instead of using the V-shaped conductor stripping elements 22 utilized in the preferred embodiment of the invention shown in FIGURES 1 through 5, a pair of flexible, inwardly extending members 36 of the type shown in FIGURE 9 of the drawings may be utilized. When the conductor connecting clip is constructed in the manner shown in FIGURE 9, the flexible elements 36 are secured in slots formed in the leg portions 14 of the generally V-shaped arms 10 of the clip adjacent the point where the leg portions are connected to the jaw portions 12. In some instances, a clip of the type illustrated in FIGURE 9 may be more easily manufactured than that which is shown in FIGURES 1 through 5 where the clip is made of a single, continuous elongated flat band.

Figure 10:
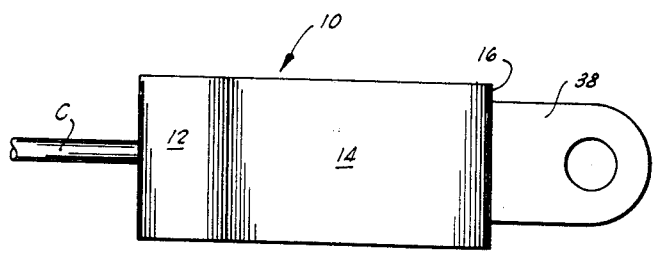

Yet another embodiment of the invention is illustrated in FIGURE 10 of the drawings. In the clip shown in FIGURE 10, an eyelet or apertured flat plate 38 is welded or otherwise suitably secured to the bight or web portion 16 of the clip and permits the clip and the conductor which is placed therein to be connected to other circuit elements or to an electrical conductor, the end of which has already been freed of insulation. In this manner, the versatility of the clip of the present invention may be substantially enhanced.

From the foregoing description of the invention, it will be perceived that the present invention provides a versatile and highly useful device by which one or more electrical conductors may be stripped of their insulation and may be clamped in a device which permits them to be easily connected to other electrical conductors or other electrical circuit elements. Although several embodiments of the invention have been hereinbefore described in detail by way of example, it will be perceived by those skilled in the art that a number of modifications may be made in the basic structure which has been disclosed without departure from, or relinquishment of, the basic principles which underlie the invention. Insofar as these changes or modifications continue to rely upon such basic principles, they are considered to be circumscribed by the spirit and scope of the invention except as the same may be necessarily limited by the appended claims or reasonable equivalents thereof.

We claim:

1. A clip for joining a pair of insulated, generally cylindrical, electrical conductors to each other and removing a portion of the insulation therefrom comprising:
   (a) an elongated band bent about transverse, longitudinally spaced bend lines to a quadrilateral configuration with said quadrilateral having two pairs of adjacent sides of substantially equal length, said quadrilateral being open at one of its corners with the opposite ends of said elongated band defining the opening into said quadrilateral, said opposite ends each having two transversely spaced slots therein with the slots in opposite ends mating upon convergence of said ends into contact with each other to form circular apertures of slightly smaller diameter than said electrical conductors; and
   (b) flexible, extensible means within said quadrilateral and having opposed cutting edges for gripping said conductors at a point spaced inwardly from the open corner of said quadrilateral and responsive to opposing compressive forces exerted upon the two corners of said quadrilateral adjacent said open corner for converging said cutting edges and moving said converged cutting edges away from the ends of said band whereby said conductors are held stationary in the slots in said ends and said cutting edges strip the insulation from said conductors in moving away from said ends.

2. A clip as claimed in claim 1 wherein said flexible, extensible means within said quadrilateral comprises a pair of opposed, angled, flexible members each having the angled portions thereof positioned in one of said two corners of said quadrilateral and responsive to the application of oppositely acting forces to said two corners to flex into a plane extending substantially parallel to the major axis of said quadrilateral, each of said angled flexible members being connected at one of its ends to one of the ends of said elongated band and having a pair of slots defined by said cutting edges in the other end thereof, the cutting edge defined slots in one of said flexible members being opposed to the cutting edge defined slots in the other of said flexible members and cooperating therewith upon the application of said oppositely acting forces to said two corners of the quadrilateral to sever and strip away a portion of the insulation of said conductors.

3. A clip as claimed in claim 1 and further characterized to include electrically conductive contact abutments adjacent said other ends of said angled, flexible members and positioned for contacting the metallic core of said conductors as the insulation is stripped therefrom.

4. A clip for conductively joining a pair of generally cylindrical insulated electrical conductors to each other comprising:
   (a) a pair of opposed, generally V-shaped, flexible members each having one of its ends slotted for gripping a pair of spaced, insulated electrical conductors, and each having a pair of slots in its other end with said slots in said other being defined by cutting edges whereby the insulation of an electrical conductor may be severed by being pressed between the slots in said other ends when said flexible members are converged by a compressive force;

(b) means interconnecting said opposed, generally V-shaped, flexible members and maintaining the slotted end portions of said members adjacent each other for coaction when said V-shaped members are compressed against each other to force said members into a generally monoplanar configuration; and (c) electrically conductive contact abutments adjacent said slots defined by cutting edges and extending transversely across each of said opposed, generally V-shaped flexible members for contacting the metallic core of said conductors following severance of the insulation therearound.

5. A device for stripping the insulation from a pair of insulating electrical conductors comprising:

(a) an arcuate, flexible member having a pair of spaced slots in one end thereof for receiving a pair of spaced, insulated electrical conductors, and further having a second pair of spaced, generally concave cutting edges at the other end thereof for severing the insulation on said pair of spaced, electrical conductors at a point spaced from the point of contact of said conductors with said pair of spaced slots;

(b) means cooperating with said arcuate member when said arcuate member is pressed into a generally monoplanar configuration to hold said pair of insulated electrical conductors stationary in said first pair of spaced slots, and to circumferentially sever the insulation around said conductors by pressing said conductors against said cutting edges;

(c) means interconnecting said arcuate, flexible member and said cooperating means to space said cooperating means from said arcuate, flexible member by a distance sufficient to permit said electrical conductors to be passed between said cooperating means and said arcuate, flexible member, said interconnecting means including a flexible elongated band connected at one of its ends to said arcuate, flexible member and at its other end to said cooperating means, said flexible elongated band being bent back upon itself intermediate its ends whereby, when its ends are moved toward each other, said arcuate member is pressed into a generally monoplanar configuration by contact with said cooperating means; and (d) an electrically conductive contact abutment adjacent said concave cutting edges and extending transversely across said arcuate, flexible member for contacting the metallic cores of both of said conductors when said arcuate member is pressed into a generally monoplanar configuration.

6. A device as claimed in claim 5 wherein said interconnecting means comprises a flat elongated band of flexible material bent to a quadrilateral configuration and enclosing said arcuate member and said cooperating means and connected at one of its ends to said cooperating means and at its other end to said arcuate flexible member.

7. A device as claimed in claim 6 wherein said cooperating means comprises a second arcuate flexible member substantially identical to said first-mentioned arcuate flexible member and positioned opposite said first arcuate flexible member so that the slots in said arcuate members are adjacent each other and the generally concave cutting edges in said arcuate members are adjacent each other.

8. A clip for conductively joining a pair of generally cylindrical electrical conductors to each other comprising:

(a) an elongated, flat band bent to the shape of a trapezium of generally diamond-shape with the ends of said band being adjacent each other at one vertex of the trapezium, said ends each having two transversely spaced slots therein with the slots in opposite ends of the band mating upon convergence of said ends into contact with each other to form substantially circular apertures of slightly smaller diameter than said electrical conductors; and (b) flexible, extensible means within said trapezium-shaped band having opposed concave cutting edges for gripping said conductor at a point spaced inwardly in said trapezium-shaped band from said one vertex and responsive to opposing compressive forces exerted upon the two vertices of said trapezium adjacent said one vertex for converging said concave cutting edges and moving said cutting edges away from the ends of said band whereby said conductors are held stationary in the slots in said ends and said cutting edges strip the insulation from said conductors in moving away from said ends.

9. A clip for removing insulation from a pair of elongated, insulated electrical conductors comprising:

(a) a pair of generally V-shaped arms each having a jaw portion and a leg portion with the leg portions of each of said arms converging and joined through a web portion so that said V-shaped arms are symmetrically disposed on opposite sides of the bisector of the angle formed by said leg portions, said jaw portions being angled with respect to said leg portions so that when said leg portions are forced toward each other in pivotation about said web portion, the jaw portions of said arms first contact each other and are then bent to increase the angle between said jaw portions and said leg portions; and (b) a pair of cooperating, V-shaped, flexible insulation stripping elements positioned in the angles between the jaw portions and leg portions of each of said arms and coacting upon compression of the arms toward each other to strip insulation from a pair of electrical conductors positioned to extend between said jaw portions and terminate adjacent said bight portion.

10. A clip for conductively joining a pair of generally cylindrical electrical conductors to each other comprising:

(a) a pair of diverging legs connected by a transverse bend at one end of the clip, said legs including an angle, the bisector of which corresponds to the longitudinal axis of the clip;

(b) a pair of converging jaws secured to the divergent ends of said legs opposite their connected ends and extending inwardly toward the longitudinal axis of the clip, said jaws terminating adjacent each other and forming with said longitudinal axis and said legs a pair of triangles each having said longitudinal axis as its longest side;

(c) a pair of flat, elongated, electrically conductive strips each bent about transverse bend lines into a generally V-shaped configuration, and each having one of the legs of said V in juxtaposition to and extending parallel to one of said jaws and the other leg of said V bent adjacent its free end into a plane extending parallel to the longitudinal axis of said clip, said other leg having transversely spaced, longitudinally extending slots extending from the free end thereof to beyond the bend adjacent said free end, said V-shaped strips each forming a triangle with the longitudinal axis of said clip; and (d) a generally cylindrical portion interconnecting each of said jaws to the adjacent side of the respective V-shaped strip and having axially spaced, circumferentially extending slots therein dimensioned to receive said electrical conductors and to permit said conductors to be griped between said jaws when said jaws are moved toward each other.

11. A clip for conductively joining a pair of generally cylindrical electrical conductors to each other comprising an elongated flat flexible member of electrically conductive material, said member being bent substantially midway of its length to include an acute angle between two diverging legs resulting from such bend, and having said diverging legs further bent relative to the bisector of said acute angle to define with said bisector a first pair and a second pair of congruent triangles smaller than the triangles of said first pair, with each triangle in said pairs lying on opposite sides of said bisector and having said bisector as a common side, said bisector constituting the longest side of the triangles in said first pair, said triangles in said second pair each being enclosed in one of the larger triangles of said first pair and each having one of its sides adjacent and extending parallel to one side of the larger triangles in which it is located, each of said smaller triangles having that vertex which is opposite the side formed by said bisector registering with the vertex of its respective larger enclosing triangle which is opposite the side of said larger triangle formed by said bisector, the adjacent, parallel sides of said pairs of triangles being interconnected through a generally circular, transverse bend in said flexible member, and said triangles in said second pair of triangles each having a second side formed by said flexible member extending inwardly from said registering vertices, and said second sides of the triangles in said second pair forming with said bisector and one side of the triangles in said first pair, a pair of congruent obtuse triangles, with the area of said obtuse triangles being such that the sum of the areas in said second pair of congruent triangles and the area in said pair of congruent obtuse triangles is equal to the sum of the areas in said first mentioned pair of congruent triangles, said second sides of the triangles in said second pair each terminating in one of the three ends of said flexible member and having a portion adjacent said free end bent into a plane extending substantially parallel to the bisector of said acute angle, said flexible member further having a pair of transversely spaced slots therethrough at said circular transverse bend for receiving a medial portion of said electrical conductors, and a pair of longitudinally extending, transversely spaced slots in the free ends of said flexible member for receiving said electrical conductors at a point spaced along said conductors from the portion of said conductors received by said first mentioned pair of slots.

12. A clip for removing insulation from a pair of elongated, insulated electrical conductors comprising:
(a) a pair of generally V-shaped arms each having a jaw portion and a leg portion with the leg portions of each of said arms converging and joined through a web portion so that said V-shaped arms are symmetrically disposed on the opposite side of the bisector of the angle formed by said leg portions, said jaw portions being angled with respect to said leg portions so that when said leg portions are forced toward each other in pivotation about said web portion, the jaw portions of said arms first contact each other and are then bent to increase the angle between said jaw portions and said leg portions; and
(b) a pair of cooperating, flexible insulation stripping elements positioned in the angles between the jaw portions and the leg portions of each of said arms and coacting upon compression of the arms toward each other to strip insulation from a pair of electrical conductors positioned to extend between said jaw portions and terminate adjacent said bight portion.

13. A clip for removing insulation from a pair of elongated insulated electrical conductors as claimed in claim 9 and further characterized to include a first set of cooperating teeth disposed opposite each other on said leg portions adjacent said web portions and a second set of cooperating teeth disposed opposite each other on each of said V-shaped, flexible elements.

14. A terminal connector for providing a terminal at the end of an electrical conductor comprising:
(a) an elongated, flat band bent to the shape of a trapezium of generally diamond shape with the ends of said band being adjacent each other at the vertex of the trapezium, said ends each having a slot therein with the slots in opposite ends of the band mating upon convergence of said ends into contact with each other to form a substantially circular aperture extending through the abutting ends of said band; and
(b) flexible, extensible means within said trapezium-shaped band having opposed concave cutting edges for gripping said electrical conductor at a point spaced inwardly in said trapezium-shaped band from said one vertex and responsive to opposing compressive forces exerted upon the two vertices of said trapezium adjacent said one vertex for converging said concave cutting edges, and moving said cutting edges away from the ends of said band whereby said conductor will be held stationary in the slots in the ends of said band and said cutting edges will strip the insulation from said conductor in moving away from said ends.

References Cited in the file of this patent
UNITED STATES PATENTS

| 2,603,679 | Pavlinetz | July 15, 1952 |
| 3,019,409 | Sarafinas | Jan. 30, 1962 |